US009593804B2

(12) United States Patent
Jagdale (10) Patent No.: US 9,593,804 B2
(45) Date of Patent: Mar. 14, 2017

(54) POSITIVE LOCKING GREASE PLUG (71) Applicant: CATERPILLAR INC., Peoria, IL (US)

(72) Inventor: Rakesh Dushyantrao Jagdale, Waco, TX (US)

(73) Assignee: Caterpillar Inc., Peoria, IL (US)

( * ) Notice: Subject to any disclaimer, the term of this patent is extended or adjusted under 35 U.S.C. 154(b) by 278 days.

(21) Appl. No.: 14/523,769

(22) Filed: Oct. 24, 2014

(65) Prior Publication Data
US 2016/0116111 A1 Apr. 28, 2016

(51) Int. Cl.
F16N 21/06 (2006.01)
B25D 17/26 (2006.01)

(52) U.S. Cl.
CPC ............ F16N 21/06 (2013.01); B25D 17/26 (2013.01); B25D 2250/125 (2013.01); B25D 2250/351 (2013.01); B25D 2250/365 (2013.01)

(58) Field of Classification Search
CPC ................................ F16N 21/06; B25D 17/26
USPC .......................................................... 184/1.5
See application file for complete search history.

(56) References Cited

U.S. PATENT DOCUMENTS

| | | | |
|---|---|---|---|
| 1,337,717 A | 4/1920 | Martin et al. | |
| RE15,526 E | 1/1923 | Wayne, III | |
| 1,549,783 A * | 8/1925 | McLaughlin | F16N 11/00 184/38.1 |
| 2,271,786 A * | 2/1942 | Watkins | F16K 17/06 137/73 |
| 2,898,081 A | 8/1959 | Johnson | |
| 4,051,921 A | 10/1977 | Sheldon | |
| 6,227,782 B1 | 5/2001 | Bowling et al. | |
| 2012/0285956 A1* | 11/2012 | Kotefski | B65D 90/32 220/89.1 |
| 2013/0081837 A1 | 4/2013 | Jagdale et al. | |
| 2013/0291754 A1* | 11/2013 | Kotefski | B65D 90/32 102/481 |
| 2014/0102740 A1 | 4/2014 | Jagdale | |

OTHER PUBLICATIONS

IHS GlobalSpec, "Lock Washers Product Details", no date, accessed on Aug. 20, 2014 at http://www.globalspec.com/specsearch/partspecs?partId=°/07b1A14D917-EFF7-4C54-9417-237DBF9FDOE0%7d&comp=826&vid=1513, 1 page.
J.Lanfranco Inc., "Bolts, Screws, Washers and More . . . "brochure, no date, 52 pages.

(Continued)

Primary Examiner — Michael Mansen
Assistant Examiner — Mark K Buse
(74) Attorney, Agent, or Firm — Law Office of Kurt J. Fugman, LLC (57) ABSTRACT A plug assembly configured for installation in a hammer assembly, the plug assembly comprising a cylindrical plug and an anti-rotation component. The cylindrical plug may include a plug head and a plug body. The plug head may include a first hole and a second hole opposite the first hole, each hole extending from the outer surface of the plug head. The anti-rotation component may include a first linear portion and a second linear portion. The first linear portion and second linear portion may both be configured to fixably engage with the hammer assembly.

20 Claims, 4 Drawing Sheets (56) References Cited

OTHER PUBLICATIONS

Globalspec, "Washers Information", no date, accessed on Oct. 24, 2014 at http://www.globalspec.com/learnmore/mechanical_components/mechanical_fasteners/, 7 pages.
Epco, "Zero-Leak Gold Plugs", no date, accessed on Jul. 31, 2014 at http://www.zeroleak.com/products/plugs_php, 3 pages.
EIS-RST Pullplugs, "EIS RST Metric Series PULLPLUGS", no date, accessed on Jul. 31, 2014, at http://eisinserts.com/eisrstpullplugs.html, 1 page.
Shakeproof, "SinuLOC ITW SHAKEPROOF", accessed on Oct. 24, 2014, at http://shakeproof.itwautomotive.com/sinuloc/ 2 pages.
Specialty Fasteners & Components, "Spiralock Threading Locking", accessed on Oct. 24, 2014 at http://www.specialty-fasteners.co.uk/products/threaded-fasteners-thread-locking/spiralock-thread-locking, 2 pages.

\* cited by examiner

POSITIVE LOCKING GREASE PLUG

TECHNICAL FIELD

The present disclosure generally pertains to hydraulic hammers, and is more particularly directed toward a positive locking grease plug for a hydraulic hammer.

BACKGROUND

Hydraulic hammers are used on work sites to break up large hard objects before such objects can be moved away. Typically, the hammer assembly is powered by either a hydraulic or pneumatic pressure source or a combination of both. Moving parts within the hammer assembly require lubrication in order to maintain proper operation. Vibrational forces during operation of the hydraulic hammer may reduce the effectiveness of the lubrication.

U.S. Pat. No. 1,337,717 to A. Martin, et al., discloses a grease cup adapted to be used in connection with locomotives for containing grease for oiling moving parts of the locomotive. The grease cup includes a locking ring for manually holding the rotating part of the grease cup against reverse rotation with respect to the stationary portion of the grease cup, and at the same time permitting free rotation of the movable part when turned in to the stationary part of the cup.

The present disclosure is directed toward overcoming one or more of the problems discovered by the inventors.

SUMMARY OF THE DISCLOSURE

In an embodiment of the present application, a plug assembly for installation in a hammer assembly is provided. The plug assembly includes a cylindrical plug and an anti-rotation component. The cylindrical plug may include a longitudinal central axis, a plug head, and a plug body. The plug head may include a top surface, a bottom surface located opposite the top surface, and an outer surface extending circumferentially about the central axis between the top surface and bottom surface. The plug head may include a socket extending into the plug head from the top surface. The plug head may include a first hole located in the plug head in which the first hole extends from the outer surface to the socket. Additionally, the plug head may include a second hole opposite the first hole in the plug head, in which the second hole extends from the outer surface to the socket. The plug body may extend along the axis away from the bottom surface of the plug head. The anti-rotation component may include a first end and a second end, in which the second end is located opposite the first end. The anti-rotation component may also include a raised portion located proximate the center of the anti-rotation component. Furthermore, the anti-rotation component may include a first linear portion extending proximally from the first end towards the raised portion. The anti-rotation component may also include a second linear portion extending proximally from the second end towards the raised portion. The first linear portion and second linear portion may both be configured to fixably engage with the grease channel of the hammer assembly.

DETAILED DESCRIPTION

This disclosure relates to a hammer assembly and in particular, to components related to a grease channel of the hammer assembly. Components such as a plug assembly may include a grease plug and an anti-rotation component. The grease plug may include features to interface with the anti-rotation component. The anti-rotation component may include certain features to lock and seal the plug assembly to the grease channel. Certain features may include positive locking mechanisms and malleable materials. The plug assembly has applicability in various other types of machines as well. For example, the plug assembly may be used in applications involving a fluidic chamber that requires a sealant plug.

Figure 1:
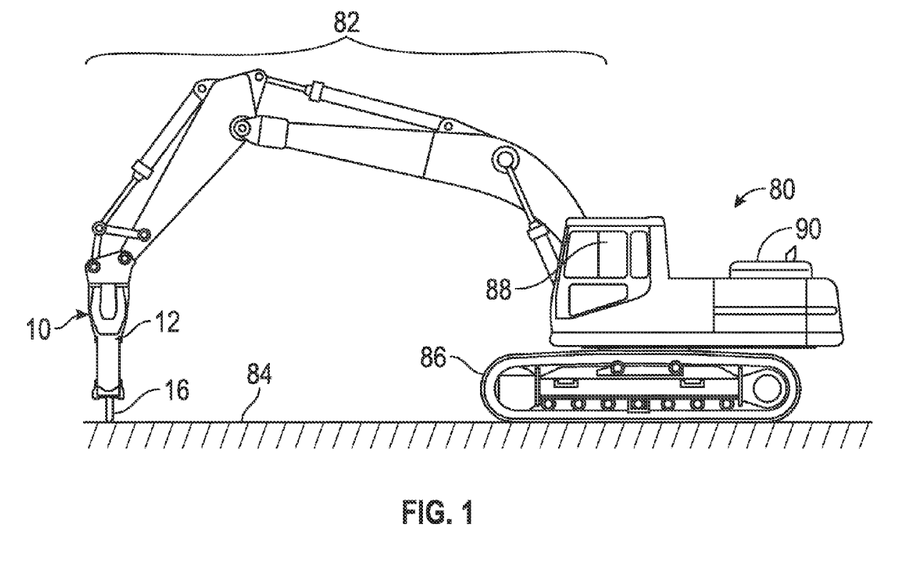
FIG. 1 is a perspective view of an example machine, which may us a hammer assembly according to an embodiment of the present disclosure.

FIG. 1 is a perspective view of an example machine, which may use a hammer assembly according to an embodiment of the present disclosure. A hammer assembly 10 may include a cylindrical housing 12 attached to a machine 80. The machine 80 may embody a fixed or mobile machine that performs some type of operation associated with an industry such as mining, construction, farming, transportation, or any other industry known in the art. For example, machine 80 may be an earth moving machine such as a backhoe, an excavator, a dozer, a loader, a motor grader, or any other earth moving machine. Machine 80 may include an implement system 82 configured to move the demolition hammer 10, a drive system 86 for propelling the machine 80, a power source 90 that provides power to implement system 82 and drive system 86, and an operator station 88 for operator control of implement system 82 and drive system 86.

Power source 90 may embody an engine such as, for example, a diesel engine, a gasoline engine, a gaseous fuel-powered engine or any other type of combustion engine known in the art. It is contemplated that power source 90 may alternatively embody a non-combustion source of power such as a fuel cell, a power storage device, or another source known in the art. Power source 90 may produce a mechanical or electrical power output that may then be converted to hydraulic pneumatic power for moving the implement system 82.

Figure 2:
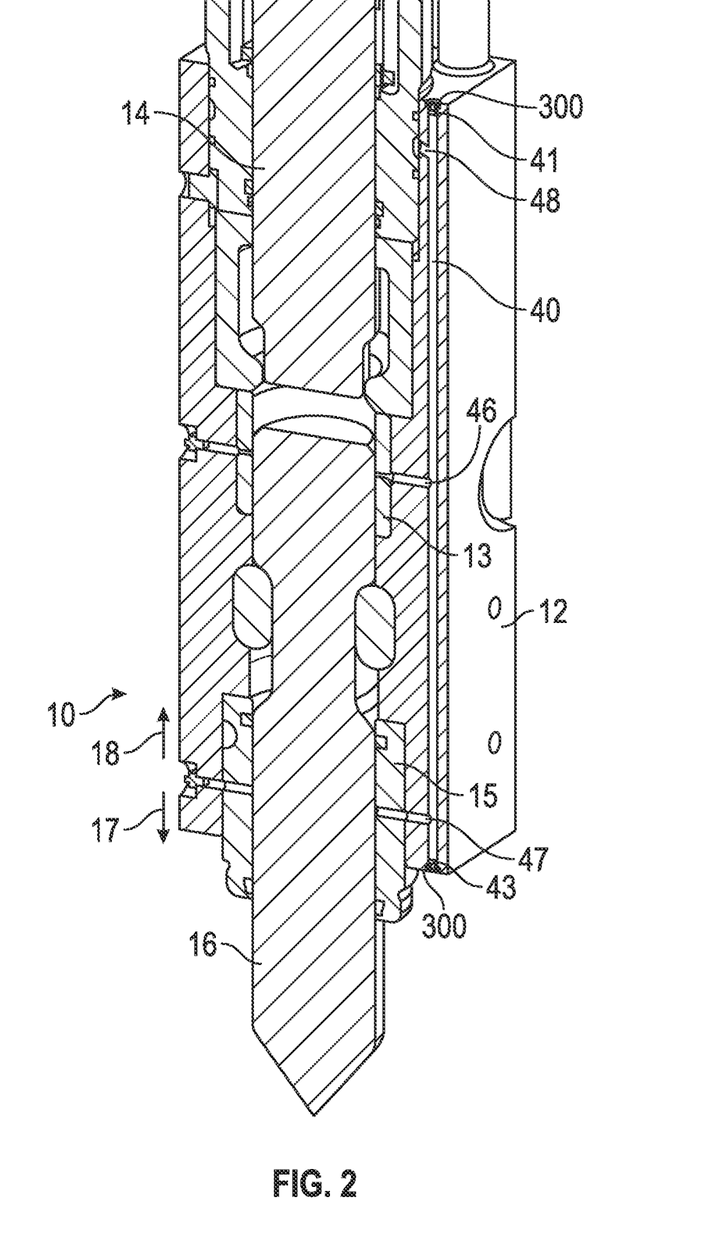
FIG. 2 is a perspective view of a cross section of hammer assembly 10 according to an embodiment of the present disclosure.

FIG. 2 is a perspective view of a cross section of hammer assembly 10 according to an embodiment of the present disclosure. In some embodiments, the hammer assembly 10 may be a structure forming an enclosed assembly with one or more openings providing access to an interior of the assembly. The hammer assembly 10 may include a cylindrical housing 12 within which a piston 14 may be slidably supported. Additionally, a work tool 16 may be supported in a lower end of the housing 12 with a portion of the work tool 16 extending outward therefrom. Work tool 16 may be adjacent to an upper bushing 13 and a lower bushing 15. The work tool 16 may have any configuration, such as for example a chisel, that would be useful in hammering applications. The work tool 16 also may be configured so as to be removable so as to allow a variety of tools with different configurations to be attached to the hammer assembly 10.

The piston 14 may be supported so as to be movable relative to the housing 12 in a reciprocating manner generally in the direction of arrows 17 and 18. More specifically, during an impact or work stroke, the piston 14 moves in the general direction of arrow 17 and near the end of the work stroke comes into contact with the work tool 16 such as shown in FIG. 2. Conversely, during a return stroke, the piston 14 retracts away from contact with the work tool 16 in the general direction of arrow 18. The reciprocating impacts of the piston 14 on the work tool 16, in turn, drive a corresponding reciprocating movement of the work tool 16. When the piston 14 strikes the work tool 16, the force of the piston 14 is transmitted to the work tool 16 in the general direction of arrow 17. This force may be applied to a hard object such as rock, concrete or asphalt in order to break up the object.

A grease channel 40 may be located on one side of cylindrical housing 12. In some embodiments, an identical grease channel may be located on the other side of cylindrical housing 12 (not shown). Grease channel 40 may be in fluid communication with certain components of the hammer assembly, such as, but not limited to, work tool 16 and a grease pump (not shown). In particular, grease, or some other lubricating fluid, may enter through an inlet channel 48 from an outside grease pump (not shown). From there, grease may travel through grease channel 40. Grease may then travel through outlet channel 46 and/or outlet channel 47. Grease entering through outlet channel 46 may lubricate upper bushing 13. This may aid in the lubrication between upper bushing 13 and work tool 16. Grease entering through outlet channel 47 may lubricate lower bushing 15. This may aid in the lubrication between lower bushing 15 and work tool 16.

Grease channel 40 may include an upper grease hole 41 located at the upper end of grease channel 40 and a lower grease hole 43 located at the lower end of grease channel 40 (hereinafter may be referred to collectively as grease holes). Upper grease hole 41 and lower grease hole 43 may be identical to one another. In particular embodiments, grease holes may be a sealant location to shut off the flow of grease to the outside. In some instances, this may aid in preventing grease from excessively leaking during operation of the hammer assembly. Either grease hole may be closed off by a plug assembly 300 as explained in the following description.

Figure 3:
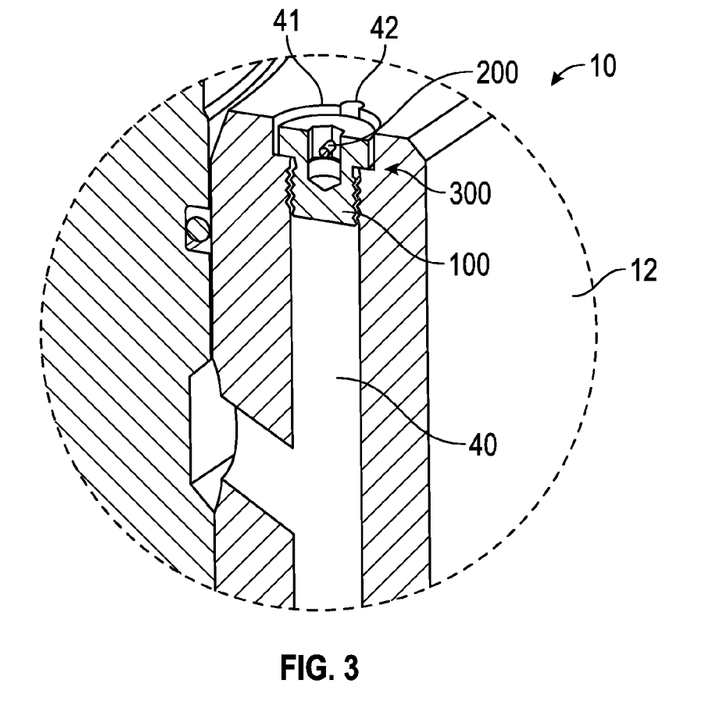
FIG. 3 is an enlarged view of a portion of the cross section of hammer assembly 10 depicted in FIG. 2.

FIG. 3 depicts an enlarged view of the embodiment of hammer assembly 10 depicted in FIG. 2. Some details of hammer assembly may have been removed or adjusted from the figure for clarity. As shown, plug assembly 300 may be located in upper grease hole 41. An identical plug assembly 300 may also be located in lower grease hole 42 (not shown). Grease holes may be a circular opening configured to receive a plug, such as plug assembly 300. Grease holes may feature a counter bore. In addition, grease holes may also include a first slot 42 adjacent to one section (hereinafter may be referred to as a first region) of the opening of the grease hole. In some embodiments, grease holes may include a second slot 49 (not shown) located in a section of the grease hole (hereinafter may be referred to as a second region) opposite from first slot 42. Plug assembly 300 may be inserted into grease holes to seal the opening of a grease hole from potential grease leakage.

Plug assembly 300 may include components that secure and maintain proper engagement of plug assembly 300 to housing 12 during operation of hammer assembly 10. These components may include, but are not limited to, a grease plug 100 and an anti-rotation component 200. In some embodiments, grease plug 100 and anti-rotation component 200 may engage with certain features of grease holes, such as first slot 42, to secure and maintain the proper engagement of plug assembly 300 to housing 12.

Figure 4:
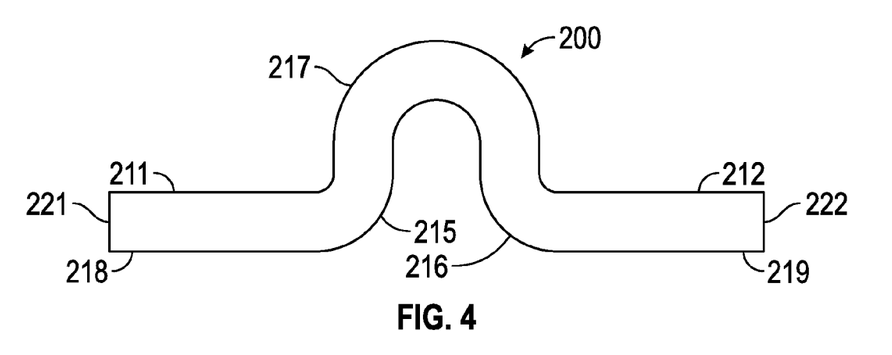
FIG. 4 is a plan view of an embodiment of anti-rotation component 200.

FIG. 4 depicts a plan view of an embodiment of anti-rotation component 200. As shown, anti-rotation component 200 may be in a pre-assembled form. In some embodiments, anti-rotation component 200 may feature a cylindrical tube including a constant diameter. In some embodiments, anti-rotation component 200 may be formed from a wire. Anti-rotation component 200 may include a diameter from 1 mm to 5 mm. In some embodiments, anti-rotation component includes a diameter of 1.8 mm. Anti-rotation component 200 may include a first end 221 and a second end 222. First end 221 and second end 222 may be located opposite one another. In some embodiments, anti-rotation component 200 may feature a bent shape resembling an upside down "U". Anti-rotation component 200 may include a first locking feature 211 (hereinafter may be referred to as a first linear portion), a second locking feature 212 (hereinafter may be referred to as a second linear portion), a first bend 215, a second bend 216, and a raised portion 217. First locking feature 211 may be located proximate to and include first end 221, and second locking feature 212 may be located proximate to and include second end 222.

In some embodiments, first locking feature 211 and second locking feature 212 may be configured to fixably engage with certain components of the hammer assembly, such as a slot adjacent a grease hole. As shown, first locking feature 211 may be a linear portion of a wire, and second locking feature 212 may also be a linear portion of a wire. In some embodiments, a portion of first locking feature 211 may be referred to as a first interference portion 218. Furthermore, a portion of second locking feature 212 may be referred to as a second interference portion 219. First interference portion 218 may extend proximally from first end 221 a certain length. In certain instances, first interference portion 218 may extend proximally from first end 221 1 to 10 mm. In certain instances, first interference portion 218 may extend proximally from first end 221 2 to 3 mm. Second interference portion 219 may extend proximally from second end 222 a certain length. In certain instances, second interference portion 219 may extend proximally from second end 222 1 to 10 mm. In certain instances, second interference portion 219 may extend proximally from second end 222 2 to 3 mm.

First locking feature 211 may transition to first bend 215, and second locking feature 212 may transition to second bend 216. First bend 215 and second bend 216 may each feature a curved portion. First bend 215 and second bend 216 may both transition towards the middle of anti-rotation component 200 to raised portion 217. In some embodiments, raised portion 217 is a U-shaped hump. Moreover, raised portion 217 may be configured to be flattened, as will be explained in connection with FIG. 7 and FIG. 8 below. After the flatting process is completed, anti-rotation component 200 may no longer include a raised portion 217 and may be a straight cylindrical tube.

Figure 5:
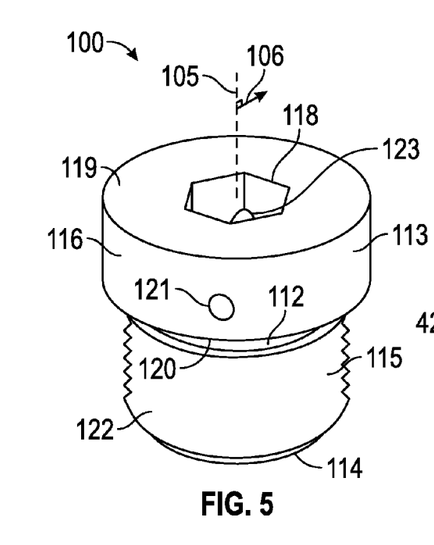
FIG. 5 is a perspective view of an embodiment of grease plug 100.

FIG. 5 depicts a perspective view of an embodiment of grease plug 100. In certain embodiments, grease plug 100 may include a plug head 113, a plug base 114, a plug body 115, a retaining groove 112, a socket 118, a first hole 121, and a second hole 123. Grease plug 100 may be solidly revolved around a central axis 105. References to radial, axial, and circumferential directions and measures refer to axis 105, unless specified otherwise, and terms such as "inner" and "outer" generally indicate a lesser or greater radial distance from, wherein a radial 106 may be in any direction perpendicular and radiating outward from axis 105.

In some embodiments, plug head 113 may feature a circular structure including a top surface 119, a bottom surface 120 (not visibly shown), and an outer surface 116. Top surface 119 and bottom surface 120 may be located at opposite ends of plug head 113. In addition, plug head 113 may include a length from 3 mm to 5 mm and may include a diameter from 15 mm to 25 mm. In some embodiments, plug head 113 may include a length about 5 mm and a diameter about 20 mm. Socket 118 may be centrally located in top surface 119 and aligned to axis 105. Socket 118 may feature a hexagonal hole extending a certain distance from top surface 119. In some embodiments, socket 118 may include an across flat distance from 4 mm to 6 mm and a depth from 3 mm to 5 mm. Socket 118 may include an across flat distance approximately 6 mm and a depth approximately 5 mm. In addition, socket 118 may be configured to receive a tool, such as a driver or a wrench, to rotate grease plug 100 during installation.

As shown in the figure, first hole 121 and second hole 123 may be located in plug head 113. In some embodiments, first hole 121 may extend from outer surface 116. First hole 121 be a through-hole and may extend all the way through plug head 113 to socket 118. First hole 121 may extend through the center of plug head 113. In some embodiments, second hole 123 may extend from outer surface 116 at a location opposite first hole 121 (not visibly shown in the figure). Second hole 123 may also be a through-hole and extend all the way through plug head 113 to socket 118. Second hole 123 may extend through the center of plug head 113. In some embodiments, first hole 121 and second hole 123 may be aligned on the same axis. First hole 121 and 123 may be configured to receive anti-rotation component 200. First hole 121 and second hole 123 may include a diameter from 1 mm to 5 mm. In some embodiments, first hole 121 and second hole 123 may include a diameter of 2 mm. In some embodiments, first hole 121 and second hole 123 may include a diameter slightly larger than the diameter of anti-rotation component 200.

Retaining groove 112 maybe located axially adjacent to plug head 113. In some embodiments, retaining groove 112 may be a channel extending a certain depth from an outer surface 122 into plug body 115. Retaining groove 112 may include a depth about 1 mm and a width about 12 mm. Retaining groove 112 may be configured to retain a sealant mechanism, such as an o-ring. The o-ring may be composed of rubber or a similar material.

Plug body 115 may be located axially adjacent to retaining groove 112. Plug body 115 may feature a cylindrical structure extending from retaining groove 112. In some embodiments, outer surface 122 of plug body 115 may be threaded. In addition, outer surface 122 may be tapered. Plug body 115 may include a diameter from 6 mm to 111 mm and a length ranging from 10 mm to 50 mm. In some embodiments, plug body 115 may include a diameter from 6 mm to 50 mm and a length ranging from 10 mm to 25 mm. In some embodiments, plug body 115 may include a diameter approximately 14 mm and a length approximately 11 mm. Plug base 114 may be located axially adjacent to plug body 115.

Figure 6:
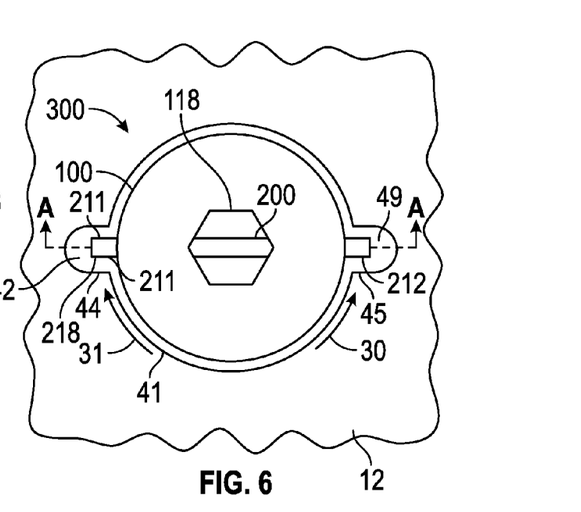
FIG. 6 is a top view of an embodiment of a plug assembly 300 installed in upper grease hole 41 of a cylindrical housing 12 within a hammer assembly.

FIG. 6 is a top view of an embodiment of plug assembly 300 installed in upper grease hole 41 of a cylindrical housing 12 within a hammer assembly. Upper grease hole 41 may be located in a cylindrical housing 12 of a hammer assembly, such as the hammer assembly 10 depicted in FIG. 3. An identical plug assembly 300 may be installed in lower grease hole 43. As shown, plug assembly 300 may include the embodiment of grease plug 100 illustrated in FIG. 5 and the embodiment of anti-rotation component 200 depicted in FIG. 4 in a final assembled form.

Anti-rotation component 200 may be flattened to achieve a straight cylindrical tubular form, as will be discussed in connection with FIGS. 7 and 8. First locking feature 211 may extend through first hole 121 and may extend beyond outer surface 116 (shown in FIG. 5). Second locking feature 212 may extend through second hole 123 and extend beyond outer surface 116 (shown in FIG. 5). In some embodiments, first locking feature 211 may extend past outer surface 116 about 1 mm to 10 mm. In some embodiments, first locking feature 211 may extend past outer surface 116 about 2 mm to 3 mm. In particular embodiments, first locking feature 211 may extend past outer surface 116 about 1.5 times the diameter of anti-rotation 200. In some embodiments, second locking feature 212 may extend past outer surface 116 about 1 mm to 10 mm. In some embodiments, second locking feature 212 may extend past outer surface 116 about 2 mm to 3 mm. In particular embodiments, second locking feature 212 may extend past outer surface 116 about 1.5 times the diameter of anti-rotation 200. The portion of first locking feature 211 extending past outer surface 116 may be first interference portion 218.

In some embodiments, anti-rotation component 200 may be assembled with grease plug 100 to form plug assembly 300 after grease plug 100 is installed into upper grease hole 41. In other embodiments, anti-rotation component 200 may be pre-assembled with grease plug 100 to form plug assembly 300 before installing plug assembly 300 into upper grease hole 41. In such embodiments, anti-rotation component 200 may be in a pre-assembled form as depicted in FIG. 5.

Normal installation of plug assembly 300 may require a clockwise turning direction as indicated by arrow 31. In instances where the plug body of grease plug 100 is threaded, plug assembly 300 may be screwed into upper grease hole 41 in the clockwise turning direction indicated by arrow 31. Upon complete rotation of plug assembly 300 into upper grease hole 41, an o-ring or another sealant mechanism may be compressed between plug head 113 and upper grease hole 41 (not shown). In some embodiments, a sealant, such as one made by Loctite®, may be applied to seal the threading of the grease plug to the grease hole.

In certain situations, such as during operation of the hammer assembly, plug assembly 300 may rotate in reverse of the direction of the screwing process, in this case counterclockwise as indicated by arrow 30, within upper grease hole 41, despite frictional resistance from the threading of plug body 115 and upper grease hole 41. In a final assembled form, as shown in the figure, first locking feature 211 and second locking feature 212 may extend into first slot 42 and second slot 49, respectively. Moreover, first locking feature 211 and second locking feature 212 may be configured to respectively engage with first slot 42 and second slot 49 and prevent counter-rotation of plug assembly 300. For example, first interference portion 218 of first locking feature 211 may extend into first slot 42. If anti-rotation component rotates in the direction of arrow 30, the outer surface of first interference portion 218 may substantially contact a slot face 44 of first slot 42. The outer surface of first interference portion 218 may catch onto slot face 44 and prevent further counter-clockwise rotation of plug assembly 300. This engagement between first locking feature 211 and first slot 42 may lock plug assembly 300 to upper grease hole 41. The diameter of anti-rotation component 200 may be large enough to provide sufficient surface area for first interference portion 218 to substantially interfere with slot face 44. An identical engagement between second locking feature 212 and second slot 49 may be formed.

In some embodiments, anti-rotation 200 may be configured to be disassembled from grease plug 100 to allow for removal of grease plug 100 from a grease hole. In such embodiments, anti-rotation 200 may be configured to be broken, detached, bent, or similar removal methods.

Figure 7:
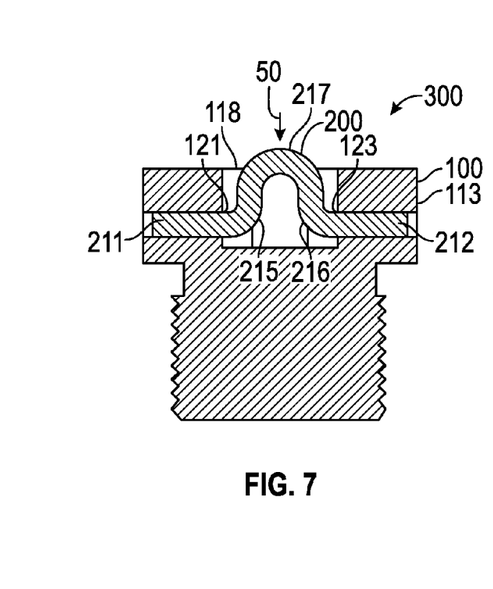
FIG. 7 is a cross sectional view taken along line A-A of FIG. 6 of plug assembly 300 before complete installation of anti-rotation component 200.

FIG. 7 is a cross sectional view taken along line A-A of FIG. 6 of plug assembly 300 before complete installation of anti-rotation component 200. As shown, anti-rotation component 200 may be in a pre-assembled form. Anti-rotation component 200 may be positioned into socket 218. First locking feature 211 may be partially inserted into first hole 121, and second locking feature 212 may be partially inserted into second hole 123. First bend 215 and second bend 216 may allow for insertion of first locking feature 211 and second locking feature 212, respectively. In some instances, first locking feature 211 and second locking feature 212 may be shorter in length than illustrated. In such cases, raised portion 217 may be taller. This may aid in the insertion of first locking feature 211 and second locking feature 212 into first hole 121 and second hole 123.

Anti-rotation component 200 may be formed to be deformed due to a directional force. In some embodiments, anti-rotation component 200 may be positioned within socket 218 to be deformed by a directional force. For example, a force may be applied to raised portion 217 in the direction indicated by arrow 50. Such a force may deform and flatten raised portion 217. Furthermore, the flattening of raised portion 217 may splay first locking feature 211 and second locking feature 212 outwards. The force along the direction of arrow 50 may extend first locking feature 211 and second locking feature 212 outwards through first hole 121 and second hole 123, respectively. The force may be applied repeatedly in the direction indicated by arrow 50 until raised portion 217 is straight and merged into a straight cylindrical tube as illustrated in FIG. 8. In some embodiments, the raised portion 217 may not be completely flattened into a straight portion. The force may be applied by a tool such as a hammer, a mallet, or other blunt instruments.

Figure 8:
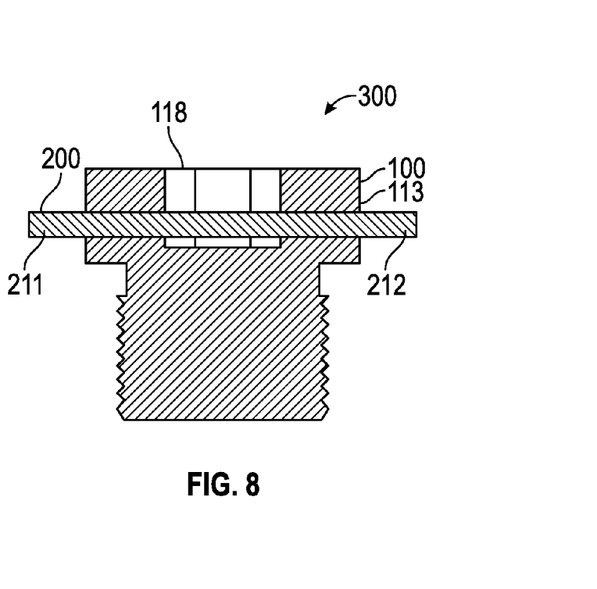
FIG. 8 is a cross sectional view taken along line A-A of FIG. 6 of plug assembly 300 after complete installation of anti-rotation component 200.

FIG. 8 is a cross sectional view taken along line A-A of FIG. 6 of plug assembly 300 after complete installation of anti-rotation component 200. As shown, anti-rotation component 200 may be in a final assembled form. The final assembled form may be of a straight cylindrical tube. The final assembled form may be achieved by a force applied to anti-rotation component 200 as described above in FIG. 7. In this form, first locking feature 211 and second locking feature 212 may extend past the outer surface 116 of plug head 113.

In some embodiments, anti-rotation component 200 may be composed of a malleable material. Anti-rotation component 200 may be composed of a material such as, but not limited to, spring steel, plastic, aluminum, and copper. Anti-rotation component 200 may be composed of ASTM A227.

INDUSTRIAL APPLICABILITY

Vibrational forces during the operation of a hydraulic hammer may loosen components of the hammer. Components, such as grease plug 100, may vibrate and rotate within a hole, such as upper grease hole 41 or lower grease hole 43. Grease plug 100 may rotate until it falls out of the hole, which may allow leakage from a fluidic chamber, such as grease channel 40. In embodiments where grease plug 100 includes a threaded base, the threading may not provide enough friction to hold the grease plug in place. The combination of grease plug 100 with a component, such as anti-rotation component 200, may form a plug assembly 300 that prevents the grease plug from rotating or escaping. A plug assembly may be installed into a grease hole that includes at least one first slot 42 along an edge of the grease hole. Certain features of anti-rotation component 200 such as a first locking feature 211 may engage with first slot 42 and prevent reverse rotation of a plug assembly. Plug assembly 300 may provide effective and cost efficient way to keep grease plugs within their designated holes.

The present invention may apply not only for hydraulic hammers, but also jackhammers, steam hammers, pneumatic hammers, or any type of mechanically powered hammer. In addition, the present invention may apply to any type of fastening mechanism used for to seal an open chamber. For example, the present invention may be applied to a screw type fastener, which relies only on torque or friction, to seal a chamber containing a gas, liquid, or semi-solid. Furthermore, the present invention may apply not only to the industrial tool industry, but also for automobile, aerospace, locomotive, or nautical based applications.

The preceding detailed description is merely exemplary in nature and is not intended to limit the invention or the application and uses of the invention. The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A plug assembly comprising:
   a cylindrical plug including
      a longitudinal central axis,
      a plug head including
         a top surface, a bottom surface located opposite the top surface, an outer surface extending circumferentially about the longitudinal central axis between the top surface and bottom surface,
         a socket extending into the plug head from the top surface,
         a first hole located in the plug head, the first hole extending from the outer surface to the socket, and a second hole opposite the first hole in the plug head, the second hole extending from the outer surface to the socket, a plug body and including cylindrical structure including threads extending along the central axis away from the bottom surface of the plug head;

an anti-rotation component including a first end and a second end, the second end located opposite the first end and defining a center between the first end and the second end, a raised portion located proximate the center of the anti-rotation component, a first linear portion extending proximally from the first end towards the raised portion, and a second linear portion extending proximally from the second end towards the raised portion.

2. The plug assembly of claim 1, wherein the first linear portion extends into the first hole of the cylindrical plug, and the second linear portion extends into the second hole of the cylindrical plug.

3. The plug assembly of claim 2, wherein the raised portion has been flattened and the first linear portion extends beyond the outer surface of the plug head, and the second linear portion extends beyond the outer surface of the plug head.

4. The plug assembly of claim 3, wherein the first linear portion extends 2 mm to 3 mm beyond the outer surface of the plug head, and the second linear portion extends 2 mm to 3 mm beyond the outer surface of the plug head.

5. The plug assembly of claim 1, wherein the raised portion comprises a U shape.

6. The plug assembly of claim 1, wherein the raised portion is configured to be deformed by a force.

7. The plug assembly of claim 6, wherein the raised portion is deformed into a linear portion.

8. The plug assembly of claim 1, wherein the diameter of anti-rotation component is from 1 mm to 5 mm.

9. The plug assembly of claim 8, wherein the diameter of anti-rotation component is 1.8 mm.

10. The plug assembly of claim 1, further including a retaining groove located in the plug body of the cylindrical plug.

11. The plug assembly of claim 10, wherein a sealant mechanism is assembled around the retaining groove.

12. A hammer assembly comprising:
a grease channel including
a grease hole located at one end of the grease channel, the grease hole including a first slot adjacent a first region of the grease hole and a second slot adjacent a second region of the grease hole opposite the first slot;
a hole that is threaded;
a cylindrical plug including
a longitudinal central axis,
a plug head including
a top surface, a bottom surface located opposite the top surface, an outer surface extending circumferentially about the longitudinal central axis between the top surface and bottom surface,
a socket extending a certain depth into the plug head from the top surface,
a first hole located in the plug head, the first hole extending from the outer surface to the socket, and
a second hole opposite the first hole in the plug head, the second hole extending from the outer surface to the socket,
a plug body and including cylindrical structure including threads extending along the central axis away from the bottom surface of the plug head, wherein the plug is threaded into the hole of the hammer assembly;
an anti-rotation component including
a first end and a second end, the second end located opposite the first end,
a first linear portion located at the first end, the first linear portion extending through the first hole of the cylindrical plug and extending beyond the outer surface of the plug head into the first slot of the grease hole, and
a second linear portion located at the second end, the second linear portion extending through the second hole of the cylindrical plug and extending beyond the outer surface of the plug head into the second slot of the grease hole.

13. The hammer assembly of claim 12, wherein the first linear portion interferes with the first slot during a reverse rotation of the grease plug.

14. The hammer assembly of claim 12, wherein the second linear portion interferes with the second slot during a reverse rotation of the grease plug.

15. The hammer assembly of claim 12, wherein the first linear portion extends 2 mm to 3 mm beyond the outer surface of the plug head, and the second linear portion extends 2 mm to 3 mm beyond the outer surface of the plug head.

16. The hammer assembly of claim 12, further including a retaining groove located in the plug body.

17. The hammer assembly of claim 16, wherein a sealant mechanism is assembled around the retaining groove, the sealant mechanism sealing the grease plug to the grease hole.

18. A plug assembly comprising
a cylindrical plug including
a longitudinal central axis,
a plug head including
a top surface, a bottom surface located opposite the top surface, an outer surface extending circumferentially about the longitudinal central axis between the top surface and bottom surface,
a socket extending into the plug head from the top surface,
a first hole located in the plug head, the first hole extending from the outer surface to the socket, and
a second hole located the opposite end of the plug head from the first hole, the second hole extending from the outer surface to the socket,
a plug body and including cylindrical structure including threads extending along the central axis away from the bottom surface of the plug head;
an anti-rotation component including
a first locking feature located at a first end, the first locking feature extending into the first hole of the cylindrical plug,
a second locking feature located at a second end opposite the first end, the second locking feature extending into the second hole of the cylindrical plug,
a raised portion located between the first locking feature and the second locking feature, and
the raised portion configured to be flattened, wherein the flattening of the raised portion extends the first locking feature outwards through the first hole and extends the second locking feature outwards through the second hole.

19. The plug assembly of claim 18, wherein the first locking feature, second locking feature, and raised portion are configured to form a linear wire.

20. The plug assembly of claim 18, wherein the raised portion comprises a U shape.

\* \* \* \* \*